UNITED STATES PATENT OFFICE.

FRIEDRICH RICHTER, OF RATHENOW, GERMANY.

CONCAVE FOR THRASHING-MACHINES.

SPECIFICATION forming part of Letters Patent No. 509,490, dated November 28, 1893.

Application filed January 21, 1893. Serial No. 459,163. (No model.)

*To all whom it may concern:*

Be it known that I, FRIEDRICH RICHTER, a subject of the King of Prussia, residing at Rathenow, in the Kingdom of Prussia, German Empire, have invented certain new and useful Improvements in Concaves for Thrashing-Machines; and I declare the following to be a full, clear, and exact description.

This invention relates to a concave for thrashing machines. The new concave is made to yield automatically, whenever any hard foreign substance, which may be carried along with the corn, comes between it and the drum. The advantage of this arrangement is, that when any foreign substance, such as a nail, &c., presses between the drum and concave, said concave yields sufficiently to allow the nail, &c., a free passage, so that no damage is done to either the drum or concave.

The invention consists essentially in providing powerful springs for enabling the concave to adjust itself automatically. And in order that my said invention may be properly understood, I have hereunto appended an explanatory sheet of drawings, whereon—

Figure 1:
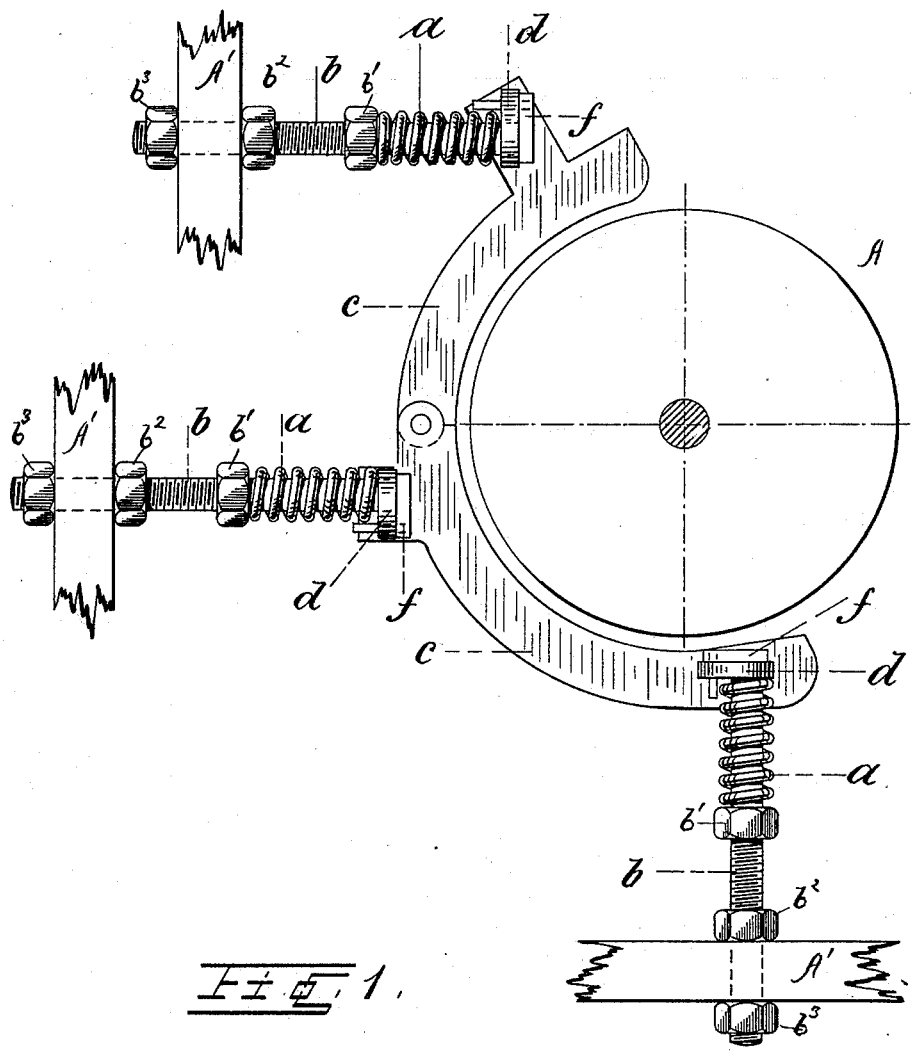
Figure 2:
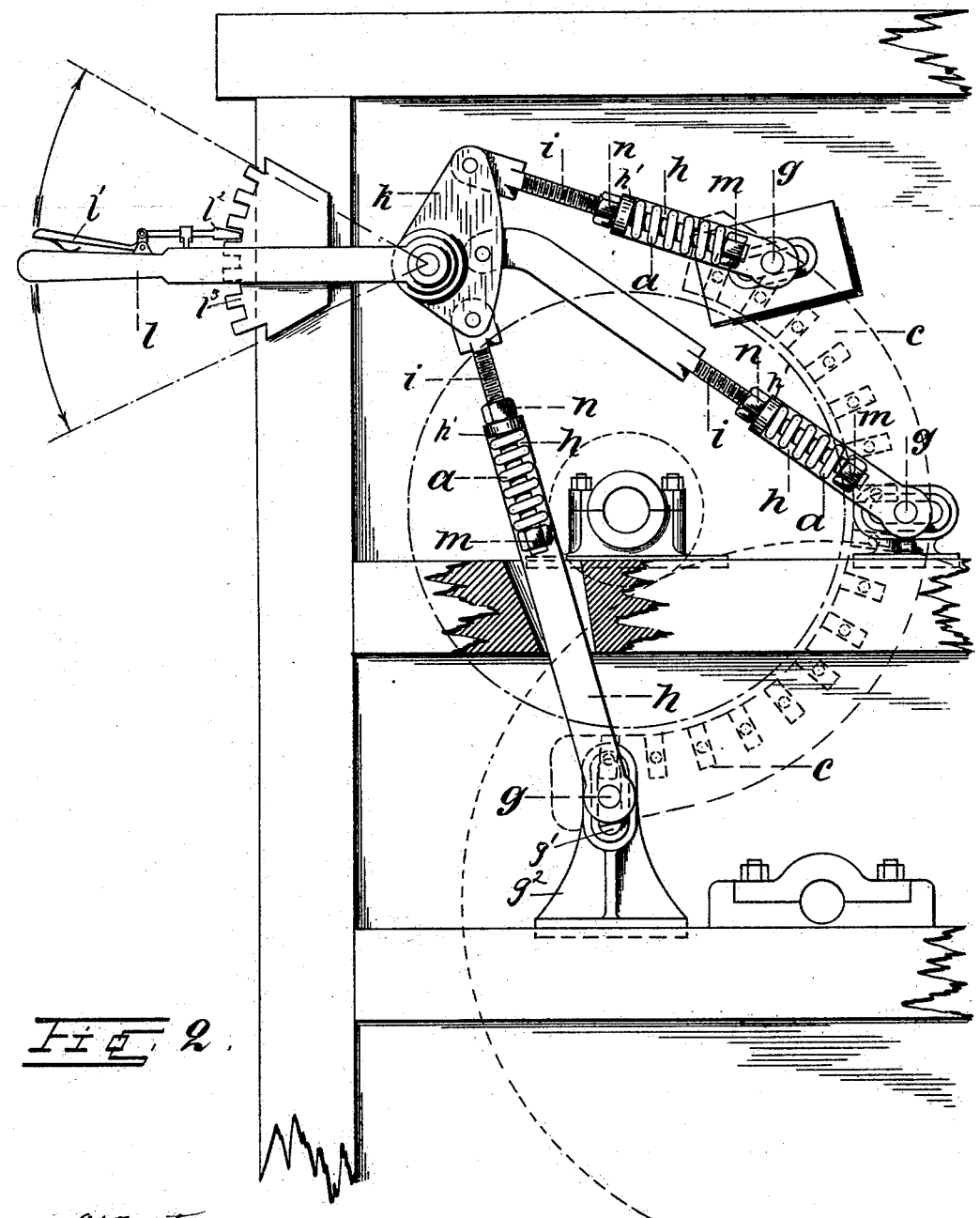

Figure 1, shows one arrangement, wherein the concave $c$, of the thrashing machine is held adjustably in position by means of the usual screw bolts $b$. Fig. 2, shows another arrangement, wherein the concave is held adjustably in place by means of lever connections.

Referring to Fig. 1, A, is the drum and $c$, is the thrashing concave, which is divided into two parts and is held adjustably in place by the screw bolts $b$, which have their rear ends passed through the frame or casing of the machine, portions of which are represented at $A'$. The bolts $b$ are adjustably secured in the frame work by the clamping nuts $b^2$, $b^3$ by means of which they may be adjusted to any desired position and firmly clamped in place. At both ends of the thrashing concave are flanges $d$, through which the bolts $b$, are passed loosely. The heads $f$, of the bolts normally bear against said flanges. When the concave is moved backward, the flanges slide on the bolts $b$. Fitted around the bolts $b$, are spiral springs $a$, which bear at one end against the flanges $d$, and, at the other, against tension nuts $b'$; they are sufficiently powerful to prevent the corn, when being thrashed, forcing back the concave, but, when any hard substance, such as a nail or the like passes between the concave and the drum, the springs $a$, are, by the movement of the flanges $d$, compressed, and the concave is pushed back sufficiently to allow the foreign substance to pass, without doing damage. When the foreign substance has passed out, the springs expand again, and force back the concave to its original position. The proper tension of the springs $a$, is regulated by means of the screw nuts $b'$.

In the arrangement at Fig. 2, the concave $c$, has projections or pins $g$, on it, which pass through guide slots $g'$ in supporting brackets $g^2$. The pins $g$, are connected to the lower ends of the adjusting rods $h$. The adjusting rods $h$, at their upper ends, are bent or flanged at $h'$, and a hole, not shown, is made in the flanges. Bolts $i$, are passed through the holes in these flanges. On the lower ends of bolts $i$, spiral springs $a$, are fitted, and these spiral springs bear, at their upper ends against the flanges $h'$, and, at their lower ends, against tension nuts $m$, on the bolts. The bolts $i$, at their upper ends, are flattened out and pivoted to a triangular plate or cam $k$, which is connected to a rod $l$. The length of the compound rod $i$, $h$, is regulated by means of the nuts $n$, on the bolts $i$. As will be seen, with this arrangement, the concave is supported on the springs $a$, which must be sufficiently strong to retain it in its normal working position, when corn is being thrashed. If any hard foreign substance passes between the drum A, and concave $c$, the latter is forced outward, against the action of the springs, to such an extent as to allow said substance to pass through, without damaging the apparatus. When the foreign substance has passed out, the concave, under the action of the springs, resumes its normal position.

Instead of using spiral springs, other suitable forms of springs may be used.

For holding the lever $l$ in any desired position a supplemental bell crank lever is pivoted thereon as shown at $l'$ in position convenient to be grasped by the hand and by means of which the dog $l^2$ may be caused to engage or release the rack $l^3$. By moving the lever $l$, the concave can, as desired, be moved farther away or nearer to the drum.

The tension of the springs can be regulated by the nuts $m$.

Having now particularly described my invention, what I claim is—

1. In combination with the cylinder or drum of a thrashing machine, a concave partially encircling the same, said concave comprising a main section and a supplemental section hinged thereto, spring rods connecting the edges of the main section with the frame and acting at substantially right angles to each other, and a spring rod for supporting the free edge of the supplemental section, substantially as described.

2. In combination with the cylinder or drum of a thrashing machine, a concave having projections supported in slots in the frame, spring rods connecting the supporting projections with a cam plate, and means for operating the cam plate, substantially as described.

In witness whereof I have hereunto set my hand in presence of two witnesses.

FRIEDRICH RICHTER.

Witnesses:
   F. COLANG,
   W. HAUPT.